United States Patent [19]

Debus, Jr.

[11] Patent Number: 4,627,080
[45] Date of Patent: Dec. 2, 1986

[54] ADAPTIVE TIMING CIRCUIT
[75] Inventor: Walter Debus, Jr., Nottingham, N.H.
[73] Assignee: AT&T Bell Laboratories, Murray Hill, N.J.
[21] Appl. No.: 674,312
[22] Filed: Nov. 23, 1984
[51] Int. Cl.$^4$ .............................................. H04L 7/02
[52] U.S. Cl. ..................... 375/110; 307/511; 328/151; 328/155; 328/162; 375/101; 375/119
[58] Field of Search ............... 375/110, 118, 101, 119; 328/155, 72, 75, 151, 162; 307/511, 518, 523, 352, 353, 358, 359

[56] References Cited
U.S. PATENT DOCUMENTS 3,404,232 10/1968 Burford .................................. 178/70
3,534,273 10/1970 Thomas ............................... 328/162
4,355,284 10/1982 Acker ................................... 328/155
4,376,309 3/1983 Fenderson et al. .................. 375/101

Primary Examiner—Marc E. Bookbinder
Attorney, Agent, or Firm—David R. Padnes

[57] ABSTRACT

An adaptive timing technique is disclosed for adjusting the sampling times of a received digital signal for fewer regeneration errors. In accordance with the disclosed technique, a sequence of digital signal samples is formed and an error signal is generated by comparing a selected sample in the sequence to a threshold. The sampling times of subsequently formed samples are then altered in response to the sample sequence and error signal only when the sample values in the sequence are successively increasing or decreasing.

12 Claims, 3 Drawing Figures

111
ADAPTIVE TIMING CIRCUIT

TECHNICAL FIELD

The present invention relates to digital transmission systems and, more particularly, to an adaptive timing circuit which varies the sampling times of a received digital signal for fewer regeneration errors.

BACKGROUND OF THE INVENTION

In digital transmission systems, the transmitted digital signal must be reconstructed after it has propagated through the transmission channel. This process is known as signal regeneration and includes timing of the received signal and reconstruction of the signal amplitude. To achieve these results, the signal regeneration apparatus must decide when to sample the received signal and then it must decide whether each sample amplitude is above or below some specified threshold.

In certain digital transmission systems, such as coaxial cables, the transmission medium is well-controlled and only slight signal delay and distortion occurs. Accordingly, the received digital signal can be regenerated with an acceptable error rate using fixed sampling times. In other digital transmission systems, however, such as those utilizing radio links, the signal distortion and delay introduced in the transmission channel are uncontrollable and often unpredictable. Signal regeneration in such systems using fixed sampling times results in an unacceptable error rate for telecommunications applications.

It is well-known that regeneration errors can be reduced if the sampling times coincide with the so-called "signal-eyes" of changing dimensions and positions. Such signal-eyes are defined by the ensemble of all possible signal transitions over the baud interval. Moreover, the regeneration errors can generally be reduced even further by the alignment of the sampling times with a predetermined position within the signal-eyes. This predetermined position is typically at the center of the signal-eyes where the signal-eye opening is the widest.

Various techniques have been used to adjust the sampling times to coincide with a predetermined position within the signal-eyes. For example, in U.S. Pat. No. 3,534,273, issued to L. C. Thomas on Oct. 13, 1970, a recursive technique requiring rather elaborate circuitry is utilized to continually monitor the signal-eye boundaries. Once the boundaries are determined, the sampling times are adjusted to coincide with the center of the signal-eyes. In another adaptive timing technique, such as disclosed in U.S. Pat. No. 4,376,309, issued to G. L. Fenderson et al on Mar. 8, 1983, a sample of the digital signal taken at a primary sampling time is compared to samples taken at secondary sampling times, where the secondary sampling times straddle each primary sampling time. Adjustment of the primary sampling time is initiated if the amplitudes of all the samples relative to the common threshold are not the same. While all of the foregoing techniques provide satisfactory results in their intended applications, more recent system applications require a degree of accuracy and sensitivity not provided by the prior art. Accordingly, the development of adaptive timing circuitry with still greater accuracy and sensitivity would be desirable.

SUMMARY OF THE INVENTION

The present invention addresses itself to the problem of providing the optimum sampling time for a received digital signal. In accordance with the present invention, a received digital signal is periodically sampled so as to form a sequence of samples and an error signal is generated by comparing a selected sample in the sequence to a reference value. The sampling times of subsequently formed samples are then driven to the optimum sampling time in response to the sample sequence and error signal only when the sample values in the sequence are successively increasing or decreasing. This optimum sampling time, which provides the fewest regeneration errors, is aligned with a predetermined position within the signal-eye pattern generated by the received digital signal.

A feature of the present invention is that the circuit design is not sampling-rate dependent and, consequently, the circuitry is readily adaptable for use in a variety of system applications.

DETAILED DESCRIPTION

Figure 1:
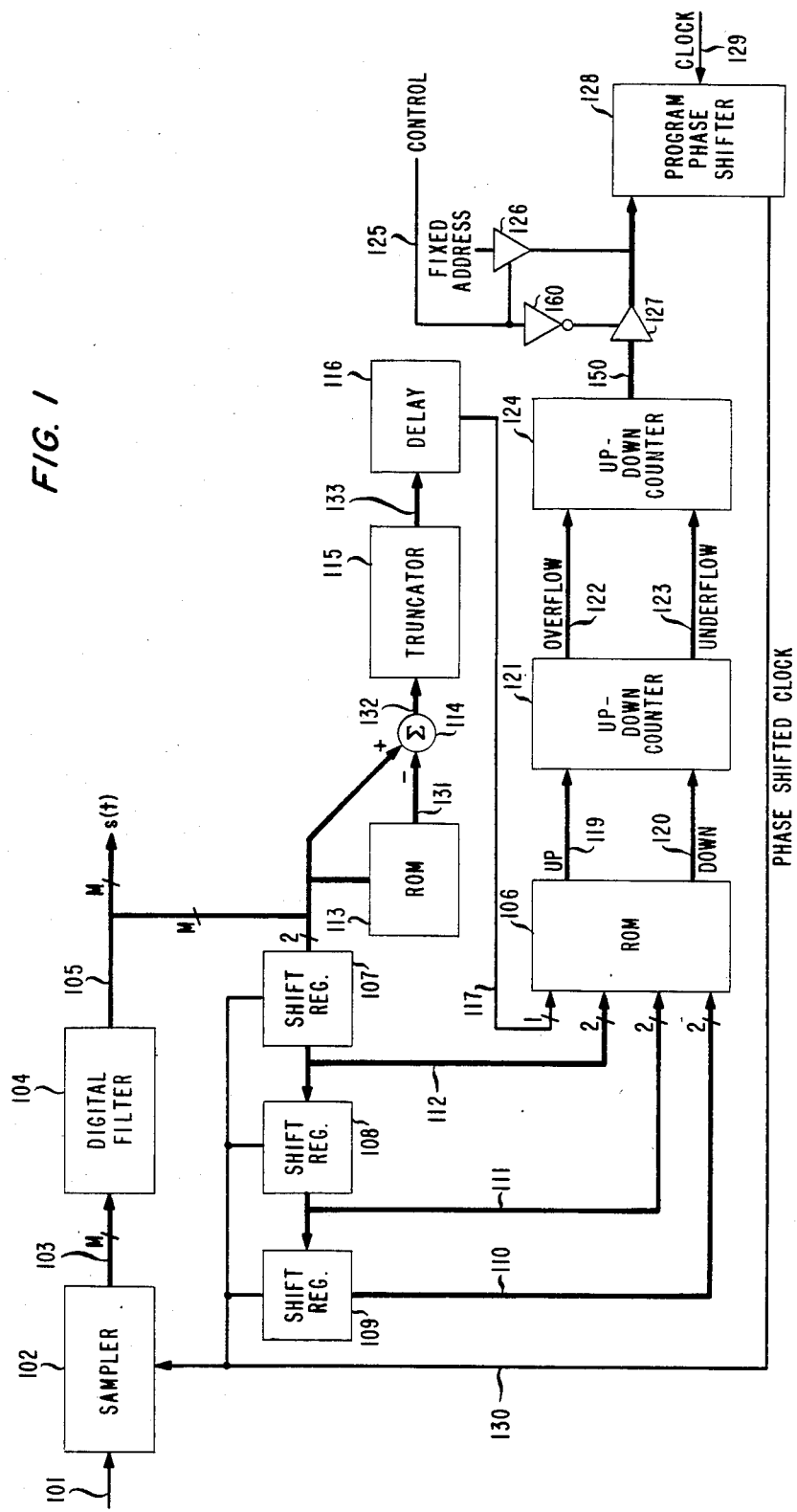
FIG. 1 is a schematic diagram of the disclosed embodiment of the present invention.

In the adaptive timing circuit shown in FIG. 1, a digital signal, such as a quaternary signal, is coupled to input lead 101 after propagation through a transmission channel. Sampler 102 samples the incoming signal on each occurrence of a clock pulse on lead 130 and quantizes the sampled value to the closest one of $2^M$ reference states, where $2^M$ is equal to or greater than the number of digital signal levels. Each assigned reference state, represented by M bits, appears on bus 103. Digital filter 104 reduces the noise and interference from each quantized sample to generate each output sample s(t) on bus 105.

The remainder of the circuitry of FIG. 1 varies the sampling time via adjustment of the timing of the clock pulses on lead 130 in order to provide samples which most nearly replicate the transmitted digital signal. As will be shown, providing such samples requires that the clock pulses coincide with a predetermined position in the signal-eye pattern generated by the received signal.

Figure 2:
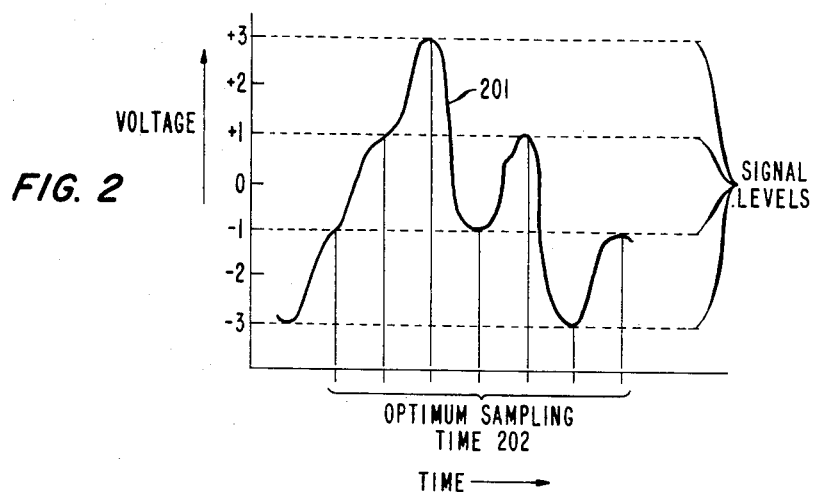
FIG. 2 is a representation of an illustrative quaternary signal.

Refer now to FIG. 2 which shows an illustrative quaternary signal 201 having four signal levels nominally represented by $\pm 1$ and $\pm 3$ volts at the optimum sampling times 202. In existing transmission systems, these signal levels are not constant but vary about the nominal voltage values due to a variety of factors such as fluctuation in the loss of the transmission path and/or uncontrollable variations in the gain of components in the signal paths.

Figure 3:
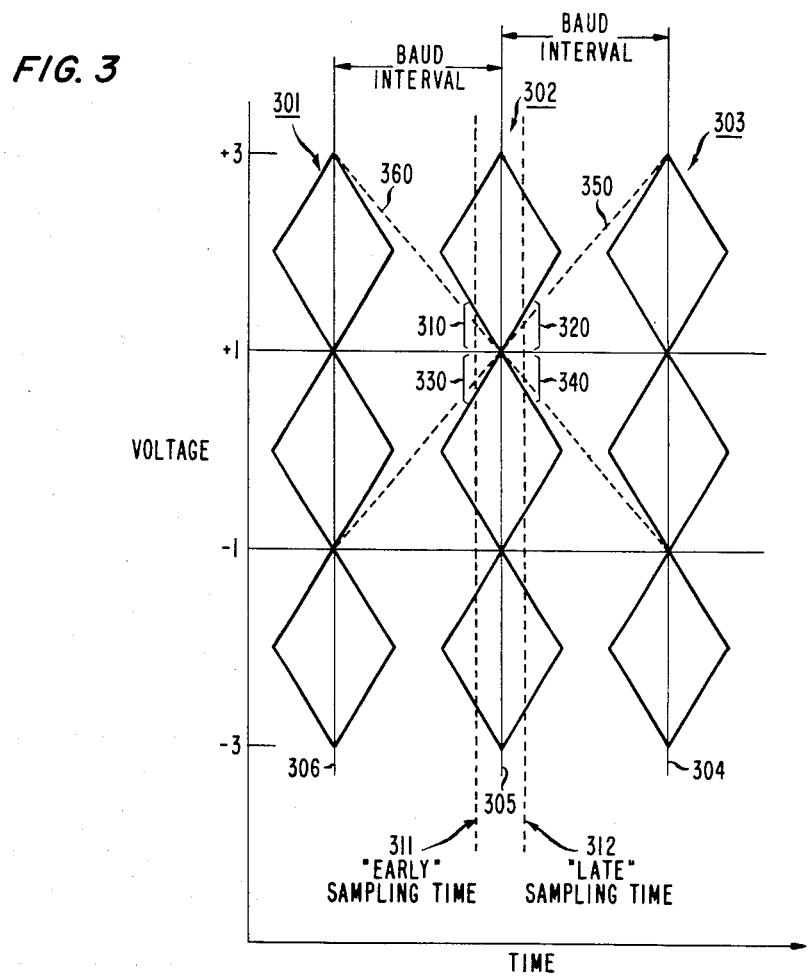
FIG. 3 is a depiction of an idealized signaleye pattern formed by the illustrative quaternary signal of FIG. 2.

FIG. 3 represents the idealized signal-eye pattern formed by a quaternary signal in the voltage-time domain. The signal-eyes are defined by the ensemble of all possible signal transitions over the baud interval. A signal-eye pattern can be seen by displaying a portion of the quaternary signal on the face of a long-persistence cathode ray oscilloscope and superimposing successive quaternary signals thereon. It is apparent, therefore, that the signal-eyes exist not at any one instant of time, but over a sufficiently long period for all the possible transitions of a digital signal to occur. In FIG. 3, three signal-eye stacks designated as 301, 302 and 303 are shown wherein stack 301 represents all possible signal transitions during a first time interval; stack 302 represents all such transitions over a later time interval, and stack 303 represents all transitions over an even later time interval. For each signal-eye stack, an optimum sampling time designated as 304, 305 and 306 exists. Each optimum sampling time coincides with a predetermined position relative to the signal-eyes. As shown, this predetermined position typically passes through the center of the signal-eyes.

In accordance with the present invention, the adaptive timing circuit of FIG. 1 alters the timing of the clock pulses on lead 130 for optimum sampling of the received digital signal. Adjustment of the clock pulses is made in response to a sequence of successive digital signal samples and an error signal derived therefrom only when the sequence of samples is either successively increasing or decreasing in value. The error signal is equal to the difference between a digital signal sample in the sequence and the closest one of the nominally transmitted digital signal levels, i.e., ±1, ±3 volts.

In order to generate each error signal, each digital signal sample on bus 105 is used as an address for target ROM 113. ROM 113 reads out the closest one of the four nominally transmitted digital signal levels for each address onto bus 131. Summer 114 then generates successive error signals on bus 132 by subtracting the signals on bus 131 from each digital signal sample on bus 105. Truncator 115 is a digital magnitude comparator which, in response to each error signal, generates a logic "1" or logic "0" pulse on lead 133. A logic "0" pulse is generated when the polarity of the error signal is positive, and a logic "1" pulse is generated for a negative polarity error signal.

It should be noted that the error signal by itself cannot be used to control the optimum sampling time as it provides anbiguous information. What is required is additional information about successive digital signal samples. To understand this relationship, refer now to FIG. 3. We will assume that signal stack 302 relates to the present sampling time and that stacks 301 and 303, respectively, relate to one sampling interval immediately preceding and succeeding the present sampling time. We will further assume that +1 volt is the closest one of the four transmitted digital signal levels to the present digital signal sample and that the sample is positive relative to +1 volt. For the resulting positive error signal, the presently formed digital signal sample can lie in either region 310 or 320. A sample lying in region 310 would result when the present sampling time is too "early", i.e., it precedes the optimum sampling time 305, while a sample lying in region 320 would mean the present sampling time was too "late", i.e., it lagged the optimum sampling time 305. An illustrative early sampling time and late sampling time are respectively designated as 311 and 312 in FIG. 3. Similarly, if a negative error signal is formed at the present sampling time relative to +1 volt, the sample can lie in either region 330 or 340. A sample lying in region 330 indicates the present sampling time is too early relative to the optimum sampling time, while a sample lying in region 340 indicates the present sampling time is too late relative to the optimum sampling time.

The above ambiguity as to the correct timing adjustment can be resolved if the error signal at any sampling time is considered along with the value of the digital sample at such time and the values of the digital samples obtained immediately prior to and immediately after such sampling time. For example, if the error signal was positive relative to +1 volt and the values of the digital samples are successively increasing in time, e.g., from −1 to +1 to +3 volts as indicated by line 350, the sample at the present sampling time would have to lie in region 320 and not region 310. Accordingly, the present sampling time would be "late" relative to optimum sampling time 305. Similarly, for a successively increasing sampling sequence such as indicated by line 350 and a negative error signal, the present sampling time would be early relative to optimum sampling time 305. If, however, the sample sequence was successively decreasing in time as indicated by line 360, the present sampling time would be early relative to optimum sampling time 305 for positive error signals and late relative to optimum sampling time 305 for negative error signals. Accordingly, adjustment of the sampling time can be made in response to a sequence comprising successive signal samples and an error signal derived from one of the samples so long as the samples in the sequence are successively increasing or decreasing. If, however, the sampled values are not successively increasing or decreasing, the ambiguity as to the proper timing adjustment is not resolved.

The specific use of the digital sample sequence and associated error signal will now be discussed.

Referring back to FIG. 1, the two most significant bits of each digital sample on bus 105 are coupled through parallel in - parallel out shift registers 107, 108 and 109. Each register, clocked by the clock signal on lead 130, stores its contents for one clock period. ROM 106 is addressed by the two most significant bits from each of the three successive digital samples on buses 110, 111 and 112. The use of the two most significant bits from each sample reduces the required ROM capacity and, in effect, quantizes each sample to the closest one of the four nominally transmitted digital signal levels. ROM 106 is also addressed by each error signal via lead 117. Delay circuit 116, interposed between the output of truncator 115 and ROM 106, ensures that each error signal arrives at ROM 106 when the two most significant bits of the associated sample, i.e., the sample from which the error signal is derived, appear on bus 111. Accordingly, ROM 106 is addressed by the two most significant bits of three successive digital samples and the error signal associated with the middlemost of the three successive digital samples.

ROM 106 is programmed to output a pulse on lead 119 when a logic "0" error signal appears on lead 117 along with successively increasing values on buses 110, 111 and 112 or when a logic "1" error signal appears on lead 117 along with successively decreasing values on buses 110, 111 and 112. Alternatively, ROM 106 supplies a pulse on lead 120 when addressed with a negative error signal on lead 117 and successively increasing values on buses 110, 111 and 112 or when addressed by a positive error signal on lead 117 and successively decreasing values on buses 110, 111 and 112. For the other ROM addresses, there are no output pulses generated because, as discussed, the proper adjustment of the sampling time in response to these addresses cannot be provided. The pulses on lead 119 indicate that the actual sampling time is late relative to the optimum sampling time and less delay is required. In similar fashion, the pulses on lead 120 indicate that the actual sampling time is too early relative to the optimum sampling time and more delay is required.

The output pulses from ROM 106 can be directly used to vary the sampling time such as by supplying them to a variable phase shifter. Such a phase shifter would, in turn, vary the phase of a clock signal supplied to lead 130 relative to a reference clock signal in response to the ROM output pulses. It is preferable, however, that the output pulses from ROM 106 be averaged by up/down counter 121. Counter 121 increments its count in response to each pulse on lead 119 and decrements its count in response to each pulse on lead 120. Counter 121 is designed to output an overflow signal on lead 122 and an underflow signal on lead 123 upon reaching predetermined limits. These limits can be selected to provide the desired amount of integration. The overflow and underflow signals are then coupled to up/down counter 124. Counter 124 supplies a multibit word output on bus 150 which represents the count. This multibit word is coupled through tri-state device 127 to digitally programmable phase shifter 128. The number of bits in the multibit word is selected to provide the requisite timing resolution wherein the greater the number of bits, the greater the resulting resolution.

Digitally programmable phase shifter 128 alters the timing of an input clock signal on lead 129 in accordance with the multibit word. This altered or phase-shifted clock is coupled to lead 130 and controls the sampling times.

The clock signal supplied to phase shifter 128 can either originate from a local oscillator or can be generated by conventional timing recovery circuitry which extracts the clock signal from the received digital signal. In the latter application, the adaptive timing circuit advantageously is adapted to interrupt any adjustment of the sample timing when the clock recovery circuit is out-of-lock. During an out-of-lock condition, a logic control signal from the clock recovery circuit is coupled via lead 125 to tri-state device 126 and through inverter 160 to tri-state device 127. The logic state of this control signal causes tri-state device 126 to couple a fixed address to phase shifter 128 and causes tri-state gate 127 via inverter 160 to provide a high impedance output, thereby effectively disconnecting phase shifter 128 from counter 124. The fixed address provided by tri-state device 126 as selected to set phase shifter 128 at some normal level so that optimum sampling time can be readily regained after proper operation of the clock recovery circuit is restored.

It should, of course, be understood that the foregoing disclosure relates only to an embodiment of the invention and that numerous modifications and alterations may be made therein without departing from the spirit and scope of the invention. For example, while the invention has been discussed with reference to a quaternary signal, the invention is applicable to any digital signal having two or more signal levels. Indeed, the digital implementation readily permits adaptation of the circuitry for other digital signals. This adaptation merely requires a change in the programming of ROMs 106 and 113 and a change in the number of bits supplied through shift registers 107, 108 and 109 to ROM 106. Specifically, the number of bits, N, from each M bit sample coupled to ROM 106 is determined by the relationship $2^N$=the number of signal levels in the digital signal on lead 101.

What is claimed is:

1. An adaptive timing circuit comprising
   means for periodically sampling a received signal at sampling times so as to form a sample sequence, said sequence comprising a plurality of samples with each sample having an amplitude,
   means for selecting one threshold value from a plurality of threshold values, said selected threshold value being the threshold value closest to the amplitude of one sample in said sequence,
   means for comparing the amplitude of said one sample and said selected threshold value, and
   means responsive to said comparison and said sample sequence for driving future sampling times toward optimum sampling times only when said samples in said sequence have successively increasing amplitudes or when said samples in said sequence have successively decreasing amplitudes.

2. The circuit of claim 1 wherein said received signal forms a signal-eye pattern over time and said optimum sampling times coincide with said signal-eye pattern.

3. The circuit of claim 2 wherein said optimum sampling time coincides with the center of said signal-eye pattern.

4. The circuit of claim 1 wherein said sequence comprises three successive signal samples.

5. The circuit of claim 4 wherein said one sample is the middlemost sample in said sequence.

6. The circuit of claim 1 wherein said received signal is amplitude modulated and carries information on at least two discrete amplitude levels.

7. The circuit of claim 1 wherein said sampling times are controlled by clock signals and said driving means varies the timing of said clock signals.

8. The circuit of claim 7 wherein said clock signals are extracted from said received signal using an external clock recovery circuitry.

9. The circuit of claim 7 wherein said clock signals are generated by an oscillator.

10. The circuit of claim 8 wherein said driving means comprises a programmable phase shifter which shifts the phase of said clock signals relative to a reference clock.

11. The circuit of claim 10 wherein said programmable phase shifter maintains a predetermined phase shift between said clock signals and said reference clock in response to a control signal applied to said driving means.

12. An adaptive timing circuit comprising
    means for periodically sampling a received signal at sampling times so as to form a succession of samples with each sample having an amplitude represented by a multibit word,
    first memory means, addressed by each multibit word, for reading out one threshold value from a plurality of threshold values, each threshold value being a plurality of bits and said threshold value read out being the threshold value closest to the addressing multibit word,
    means for forming a difference between said plurality of bits of said read out threshold value and the associated first memory means multibit word address, and
    second memory means, addressed by said difference and predetermined bits of the associated first memory means multibit word address and predetermined bits of the first memory means multibit word addresses preceding and succeeding the associated multibit word address, for reading out an adjustment signal which varies future sampling times, said adjustment signal being read out only when said preceding associated and succeeding multibit word addresses respectively represent successively increasing or successively decreasing amplitudes.

* * * * *